United States Patent [19]

Jabalee

[11] Patent Number: 4,569,779

[45] Date of Patent: Feb. 11, 1986

[54] SOLUTION FOR CLEANSING A COOLING SYSTEM

[76] Inventor: Walter J. Jabalee, 42077 Toddmark, Mt. Clemens, Mich. 48044

[21] Appl. No.: 688,588

[22] Filed: Jan. 3, 1985

[51] Int. Cl.$^4$ .......................... C02F 5/08; C23G 1/02
[52] U.S. Cl. ............................................ 252/80; 134/3; 134/34; 134/41; 252/79.2; 252/79.4; 252/81; 252/87; 252/136; 252/142; 252/146; 252/147
[58] Field of Search ........................ 252/79.2, 79.4, 80, 252/81, 87, 136, 142, 146, 147; 134/3, 34, 41

[56] References Cited

U.S. PATENT DOCUMENTS

| | | | |
|---|---|---|---|
| 1,765,331 | 6/1930 | Gravell | 134/41 |
| 2,662,814 | 12/1953 | Swihart | 252/80 |
| 2,873,256 | 2/1959 | Hatch | 134/41 |

FOREIGN PATENT DOCUMENTS 355888  3/1980  Austria .

*Primary Examiner*—Paul Lieberman
*Assistant Examiner*—Robert A. Wax
*Attorney, Agent, or Firm*—Gifford, VanOphem, Sheridan & Sprinkle

[57] ABSTRACT

The present invention provides a chemical solution and method which, when introduced into the cooling system of a liquid cooled engine, removes oxidized material such as sludge and rust by chemical reduction without draining or flushing the cooling system. The solution comprises a liquid carrier, such as water, which is miscible with the liquid of the cooling system, phosphoric acid and zinc oxide. The carrier constitutes about 70 percent by weight of the chemical solution, the phosphoric acid constitutes about 26-27 percent by weight of the solution and the zinc oxide constitutes about 3-4 percent by weight of the solution.

9 Claims, No Drawings

SOLUTION FOR CLEANSING A COOLING SYSTEM

BACKGROUND OF THE INVENTION

I. Field of the Invention

The present invention relates to a solution for cleaning a cooling system of an engine of oxidized material, such as rust, sludge and the like.

II. Description of the Prior Art

Internal combustion engines, compressors and the like (hereinafter collectively called engines) oftentimes include liquid cooling systems. Conventionally the engines and systems include at least some ferrometallic components. These liquid cooling systems comprise a heat exchanger or radiator which is fluidly connected to cooling passageways formed in the engine. In operation, a liquid, often including an antifreeze, is continuously circulated through the engine cooling system in order to remove the internal engine heat. This engine heat is dissipated by the radiator to air flow through the radiator.

A common problem with these previously known cooling systems is that the liquid contained within the cooling system becomes congested with oxidized material or rust over a period of time. This oxidized material ultimately coalesces in sludge which can cause blockage of the cooling system and particularly blockage of the relatively small tubes in the radiator of the cooling system. When such blockage occurs, it impairs the efficiency of the cooling system which can result in damage to the engine from overheating. Furthermore, such blockage in the radiator or other portions of the cooling system cause restrictions in the fluid flow of the cooling system thus requiring more pumping power in order to circulate the coolant through the cooling system. Since the coolant is conventionally pumped by a power take-off from the engine, such blockage necessarily decreases the overall efficiency of the engine.

It has been the previous practice to simply flush the liquid from the coolant system whenever excessive oxidized material is present within the system. Such flushing, however, is disadvantageous for a number of reasons.

One disadvantage of flushing the cooling system is that such flushing is a messy and time consuming job. Furthermore, since the liquid flush from the cooling system is simply discarded and the cooling system filled with new coolant, flushing the cooling system is expensive due to the cost of the new coolant or included antifreeze.

A still further disadvantage of the previously known practice of flushing the cooling system is that flushing the cooling system removes some, but not all, of the oxidized material. Consequently, the previously known practice of flushing the cooling system is only partly effective to remove oxidized material.

SUMMARY OF THE PRESENT INVENTION

The present invention provides a solution and method which overcomes all of the above mentioned disadvantages of the previously known practice of flushing the cooling system to remove oxidized material.

In brief, the present invention provides a chemical solution which, when introduced into the coolant of a cooling system, removes oxidized material by chemical reduction not only from the metal parts of the cooling system, but also from the liquid coolant itself. In addition, the solution simultaneously coats and protects the metal components of the cooling system from further oxidation.

In the preferred embodiment of the invention, the chemical solution comprises phosphoric acid ($H_3PO_4$), zinc oxide (ZnO) and a liquid carrier, such as water, which is soluble with the coolant within the cooling system. Preferably, the liquid carrier comprises about 70 percent by weight of the chemical solution, the phosphoric acid constitutes about 26–27 percent by weight of the solution, and the zinc oxide constitutes about 3–4 percent of the solution. The solution also preferably contains a small portion (less than 0.1% by weight) of an antioxidant, such as pyrogallol (1, 2, 3 trihydroxybenzene).

Upon introduction of the solution into the coolant of a cooling system containing excessive oxidized material (either on the cooling system surfaces, or as particulate matter in circulation) the phosphoric acid reacts with the oxidized material, i.e. iron (III) oxide ($Fe_2O_3$), and is believed to produce iron (III) phosphate ($FePO_4$) and water, both of which are dispersed in the coolant. Unlike iron (III) oxide, iron (III) phosphate does not coalesce to form sludge which can block the fluid passageways of the cooling system.

Simultaneously, as the phosphoric acid reacts with and removes the iron (III) oxide by chemical reduction, the zinc oxide is believed to adhere to the now rust free surfaces of the engine cooling system and protects the metal components of the engine cooling system against further oxidation. Whatever the reaction mechanisms, the key to the invention is that the cleaning solution simultaneously chemically reduces rust already in the cooling system and protects the system from further oxidation.

In practice, it is necessary to introduce only a small amount of the chemical solution into the cooling system and still completely dissolve the rust and sludge from the cooling system. For example, tests have shown that only about thirty ounces or less of the chemical solution are needed to clean a twenty quart cooling system laden with oxidized material. Furthermore, the dissolution of the rust and sludge from such a cooling system requires less than one hour to accomplish.

DETAILED DESCRIPTION OF A PREFERRED EMBODIMENT OF THE PRESENT INVENTION

As used in this specification, the word cooling system shall mean a cooling system for an internal combustion engine, compressor or the like, in which coolant is circulated through cooling passages formed in the engine and through a heat exchanger, such as a radiator, in which the heat is dissipated. Likewise, as used in this specification, the word engine shall mean internal combustion engines, compressors and other devices which, during operation, generate heat which is removed by the cooling system.

The present invention comprises a chemical solution which, when added to the coolant of a cooling system, removes all of the oxidized material, such as rust, sludge and the like, from the cooling system. In addition, the solution simultaneously coats the metal components, and specifically the steel or iron components, to protect such components against further oxidation.

The chemical solution comprises a liquid carrier which constitutes about 70 percent by weight of the solution and which itself is miscible with the coolant. Since most coolants are water miscible, the carrier preferably comprises water.

The chemical solution further includes phosphoric acid which constitutes about 26–27 percent by weight of the overall solution. The chemical solution further comprises zinc oxide which constitutes about 3–4 percent by weight of the overall solution. Lastly, the solution preferably, but not necessarily, contains a small portion of an antioxidant, such as pyrogallic acid (pyrogallol).

The above ranges have been tested and found to be useful.

The chemical solution is premixed so that the zinc oxide is completely dissolved in the water and phosphoric acid. The mixed solution is then introduced into the coolant of the cooling system without draining, flushing or otherwise altering the cooling system or the coolant contained within the system.

Upon introduction of the solution into the coolant in the cooling system, the phosphoric acid is believed to react with oxidized material ($Fe_2O_3$) in accordance with the following equation:

$$2H_3PO_4 + Fe_2O_3 \rightarrow 2FePO_4 + 2H_2O$$

Consequently, the rust ($Fe_2O_3$) is dissolved by chemical reduction.

An important feature of the instant invention is that the chemical solution reacts not only with oxidized material entrained within the coolant, but also reacts with oxidized material on the metal components of the cooling system in order to clean the rust from the component surfaces.

Simultaneously, as the rust is dissolved by chemical reduction from the metal surfaces of the cooling system components, the zinc ions from the zinc oxide are believed to adhere to the surface of the now cleaned metal components. In any event, the cleaned surfaces of the cooling system components are believed to be coated with zinc from the zinc oxide, and are protected against further oxidation. The antioxidant, if present, also renders the components of the cooling system more resistant to oxidation.

EXAMPLE

A chemical solution is first prepared and mixed at room temperature with the following materials (all materials are added, in any order, to the water):

| Material | Weight | Percent |
| --- | --- | --- |
| Water | 300 lbs. | 70% |
| Zinc Oxide | 15 lbs. | 3.5% |
| Phosphoric Acid | 115 lbs. | 26.5% |
| Pyrogallol | 0.2 lbs. | 2.1% |

The resulting chemical solution has a specific gravity of 1.180 and a pH of 1.5.

Ten ounces of the solution are then introduced into a cooling system having a twenty quart cooling capacity and in which the coolant is laden with oxidized material. Following the introduction of the chemical solution into the coolant in the cooling system, the coolant together with the chemical solution are circulated through the cooling system for approximately one hour.

Following the above circulation of the coolant and chemical solution through the cooling system, the liquid in the cooling system reaches a pH of 7.5 (essentially neutral) and is completely free of oxidized material. Furthermore, the iron components of the cooling system are believed to be coated with a thin layer of zinc, and these components are thus protected from further oxidation. Of course, if heavy oxidation is present in the cooling system, the amount of solution employed can be appropriately increased. In a twenty quart cooling system extremely laden with oxidized material, thirty ounces of solution are needed to dissolve the oxidized material in the cooling system.

From the foregoing, it can be seen that the present invention provides a unique chemical solution as well as a method for cleaning a cooling system of oxidized material. The primary advantage of the present invention is that the oxidized material is removed from the coolant in the cooling system without the necessity of flushing the cooling system or draining the cooling system. Instead, the solution of the present invention is directly introduced into the coolant in the cooling system and the cooling system is operated in its normal fashion. No harmful effects on either the cooling system or the coolant has been observed.

Having described my invention, however, many modifications thereto will become apparent to those skilled in the art to which it pertains without deviation from the spirit of the invention as defined by the scope of the appended claims.

I claim:

1. A chemical solution which, when introduced to the coolant of a cooling system of an engine, dissolves oxidized material within the cooling system and simultaneously protects said cooling system from oxidation, said chemical solution comprising:
a liquid carrier miscible with the liquid of the cooling system,
phosphoric acid, and
zinc oxide,
wherein said carrier constitutes about seventy percent by weight of said solution, said phosphoric acid constitutes about twenty six–twenty seven percent by weight of said solution, and said zinc oxide constitutes about three–four percent by weight of said solution and
wherein said solution further comprises an antioxidant.

2. The invention as defined in claim 1 wherein said carrier comprises water.

3. The invention as defined in claim 1 wherein said antioxidant comprises less than 0.1% by weight of said solution.

4. The invention as defined in claim 3 wherein said antioxidant comprises pyrogallic acid.

5. A method for cleaning a liquid cooling system of oxidized material comprising the steps of
mixing a solution of phosphoric acid, zinc oxide and a carrier miscible with the liquid of the cooling system, introducing said solution into the engine cooling system while the engine cooling system is substantially filled with the liquid; and
circulating the solution intermixed with the liquid throughout the cooling system.

6. The invention as defined in claim 5 wherein said carrier constitutes between about seventy percent by weight of said solution, said phosphoric acid constitutes about twenty six–twenty seven percent by weight of said solution and said zinc oxide constitutes about three–four percent by weight of said solution.

7. The invention as defined in claim 5 wherein said solution comprises an antioxidant.

8. The invention as defined in claim 7 wherein said antioxidant comprises pyrogallic acid.

9. The invention as defined in claim 5 wherein said circulating step comprises circulating said intermixed solution and liquid through said cooling system for about one hour.

* * * * *